May 11, 1965 M. C. TOURTELLOTTE 3,182,785
CONVEYER STORING AND SEPARATING DEVICE
Filed Jan. 21, 1963 4 Sheets-Sheet 1

INVENTOR.
MILLS C. TOURTELLOTTE
BY
Whittemore, Hulbert & Belknap
ATTORNEYS

United States Patent Office 3,182,785
Patented May 11, 1965

3,182,785
CONVEYER STORING AND SEPARATING DEVICE
Mills C. Tourtellotte, 1114 Inwood Drive, P.O. Box 746, Richmond, Tex.
Filed Jan. 21, 1963, Ser. No. 252,816
16 Claims. (Cl. 198—127)

This invention relates generally to storing and separating apparatus and refers more particularly to apparatus for the storing and subsequent automatic separation from storage of regular bodies or articles conveyed on roller type conveyers of the type used in continuous production lines.

It is an essential object of this invention to provide a conveyer storing and separating device having a unique combination of conveyers constructed and arranged to store the articles and subsequently separate the stored articles on signal in a speedy and efficient manner.

Another object is to provide a conveyer storing and separating device in which the articles or bodies are stored in a minimum amount of space using the full capacity of the conveyer system.

Another object is to provide a conveyer storing and separating device having roller type conveyers in which sliding friction is reduced to a minimum, thereby prolonging the useful life of the rollers.

Another object is to provide a conveyer storing and separating device in which the articles may be immediately rolled out of storage and separated from the other articles when the system receives a signal.

Another object is to provide a conveyer storing and separating device which may be used with other similar devices to feed into a common system.

Another object is to provide a conveyer storing and separating device having an inclined conveyer, a tilting conveyer at the low end of the inclined conveyer to receive articles therefrom, and supported for pivotal movement from a position inclined at substantially the same angle as the inclined conveyer to a horizontal position, and a stop positioned to block articles on the tilting conveyer in the inclined position thereof, but to clear the articles in the horizontal position thereof.

Another object is to provide a tilting conveyer having both free turning and power driven rollers.

Another object is to provide means for stopping the flow of articles on the inclined conveyer when the tilting conveyer is horizontal.

Another object is to provide means for increasing the rolling friction between the articles and the power driven rollers on the tilting conveyer.

Another object is to provide means for returning the tilting conveyer to its inclined position immediately after the transfer of an article from the tilting conveyer.

Another object is to provide a completely automatic system for the storage and intermittent separation of articles or bodies from storage.

Other objects and features of the invention will become apparent as the description proceeds, especially when taken in conjunction with the accompanying drawings, wherein.

Figure 1:
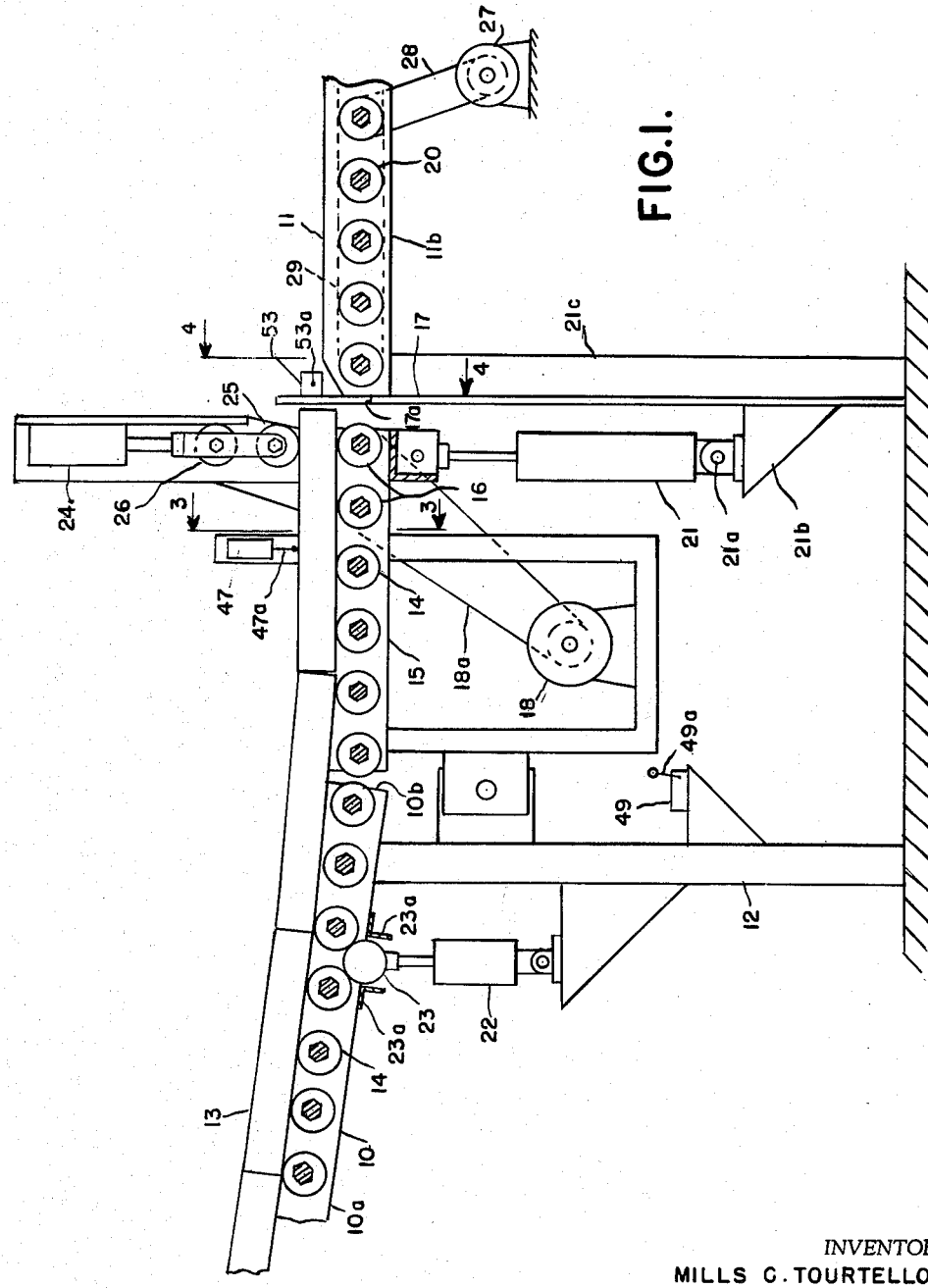
FIGURE 1 is a side elevational view of apparatus embodying my invention, shown in transfer or separating position, with parts in section on the line 1—1 of FIG. 3.

Referring now more particularly to the drawings, the apparatus includes an inclined gravity-type conveyer 10, a horizontal powered conveyer 11, and a tilting conveyer 15 between the gravity and power conveyers.

The conveyer 10 is supported in fixed position by structure including frame member 12, and has the elongated, laterally spaced, parallel channels 10a which form the opposite sides of the conveyer. While only one channel 10a is shown, these channels bear the same relation to each other as the channels 15a of the tilting conveyer 15 shown in FIGURE 3. The longitudinally spaced rollers 14 extend between and are journaled for free rotation by the channels 10a. The conveyer 10 slopes downwardly at an angle such that the elongated articles 13 will move by gravity on the free turning rollers toward the discharge end 10b. The articles are kept in single file end-to-end alignment within the narrow space between the channels 10a. Preferably, the channels 10a are adjustable toward and away from each other to accommodate different widths of articles. If the articles were narrow and the conveyer wide, the articles might not line up end for end.

The horizontal conveyer 11 is supported in fixed position by structure including frame member 11a, and has the elongated, laterally spaced, parallel channels 11b which form the opposite sides of the conveyer. While only one channel 11b is shown, these channels bear the same relation to each other as the channels 15a of the tilting conveyer 15 shown in FIGURE 3. Rollers 20 extend between and are journaled for rotation by the channels 11b. The rollers 20 are spaced apart along the length of conveyer 11 from the receiving end 11c thereof. The rollers 20 are adapted to be driven by a motor 27 through roller 28 and 29.

The tilting conveyer 15 is made up of the elongated, laterally spaced, parallel channels 15a which form the opposite sides of the conveyer. Rollers 14 and 16 extend between and are journaled for rotation by the channels 15a. The rollers 14 are spaced apart along the length of conveyer 15 and are free to turn. The conveyer 15 is carried by a frame 15b which is supported for pivotal movement about the horizontal axis of pin 15c. As shown, the pin 15c is carried by the frame bracket 12 on frame member 12. The pin pivotally supports bracket 15d on conveyer frame 15b. The pivotal mounting permits conveyer 15 to move from the inclined FIG. 2 to the horizontal FIG. 1 position. A motor 18 carried by the conveyer frame 15b is provided to drive the rollers 16 through the roller chain 18a. Preferably, the channels 15a are adjustable toward and away from each other for the same reasons as channels 10a.

A pinch roller 25 is provided above driven rollers 16 to press the articles 13 against the driven rollers when they are rotated to increase the drive traction. The pinch roller 25 is supported for free rotation on a bracket 25a secured to the end of piston rod 24a which extends from air cylinder 24 and is secured to the piston 24b within the air cylinder. Cylinder 24 is fixed to a supporting frame 24c carried by the tilting conveyer 15. The frame 24c has a plate 24d in position to be contacted by a roller 26 carried by bracket 25a to guide the pinch roller as it is moved up and down by cylinder 24.

The tilting conveyer 15 is moved about pivot 15c by an air cylinder 21 pivoted at 21a to a bracket 21b on frame member 21c. A piston 21d reciprocates within cylinder 21 and has a rod 21e extending from the cylinder and pivoted to the discharge end of the tilting conveyer by a pin 21f.

An air cylinder 22 is pivoted at 12b to a bracket 12c on frame member 12. The cylinder 22 has a piston 22a reciprocable therein and piston rod 22b extends from the cylinder and has a cylindrical friction body 23 at its upper end. The cylindrical body 23 is a brake and is adapted to engage two rollers 14 on conveyer 10 when raised by cylinder 22 to prevent the movement of articles down the conveyer 10 past the braked rollers. Angles 23a carried by the conveyer 10 guide the vertical movement of brake 23.

The frame member 21c which supports the receiving end of the conveyer 11 has a plate 17 extending across the discharge end of the tilting conveyer which provides a stop. The upper edge of the stop plate 17 is designated 17a. Articles on the tilting conveyer engage the stop 17 when the tilting conveyer is in the FIGURE 2 position aligned with conveyer 10, so that the articles are held back or stored. When the tilting conveyer 15 is raised into alignment with conveyer 11, as shown in FIGURE 1, the articles clear stop 17 and can be transferred to conveyer 11 over the upper edge 17a of the stop.

Figures 3, 4, 6:
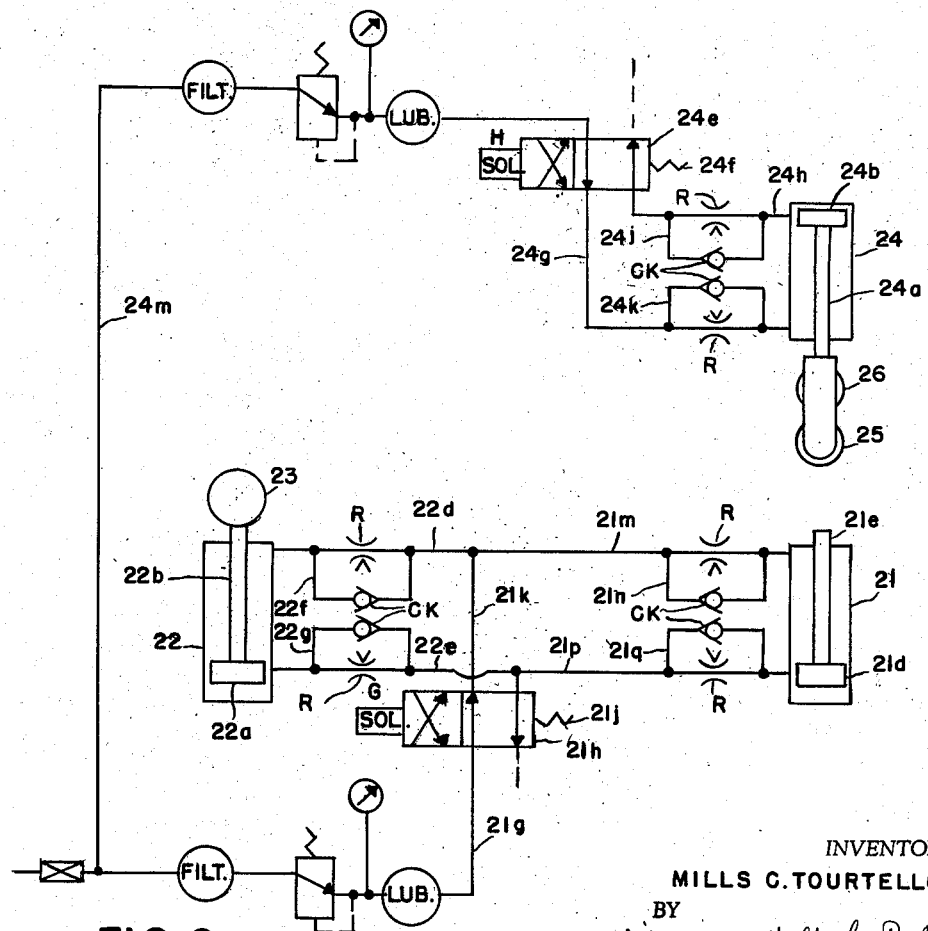
FIGURE 3 is a sectional view taken on the line 3—3 of FIGURE 1.
FIGURE 4 is a view taken on the line 4—4 of FIGURE 1.
FIGURE 6 is a schematic air circuit diagram showing the piping for the solenoid valves and air cylinders.

An air circuit diagram is shown in FIGURE 6. Air under pressure is delivered to the cylinders 21 and 22 from a line 21g through valve 21h controlled by solenoid G. The valve normally assumes the position shown under the pressure of spring 21j, but will reverse the flow upon the energization of solenoid G. The line 21k beyond the valve extends to the upper end of cylinder 21 through the line 21m which has a restriction R. Air delivered to the rod end of cylinder 21 will follow the bypass circuit 21n around the restriction for greater speed of flow, the check valve CK permitting flow in a direction toward the cylinder only. The line 21p leads to the piston end of cylinder 21 through a restriction R, although when air is delivered to the piston end of the cylinder it will take the bypass circuit 21q around the restriction.

The line 21k also leads to the rod end of cylinder 22 through line 22d which has the restriction R. The line 22e extends through a restriction R to the piston end of cylinder 22. The bypass circuits 22f and 22g are provided around the restrictions R in the two lines 22d and 22e.

The air line 24m extends through valve 24e to the air cylinder 24. Valve 24e normally assumes the position shown under the pressure of spring 24f, but is shifted by the energization of solenoid H. Leading from the valve is a line 24g to the rod end of cylinder 24 through a restriction R. The piston end of the cylinder 24 receives air via line 24h through a restriction R. Bypass circuits 24j and 24k are provided around the restrictions in lines 24g and 24h.

The bypass circuits all have check valves in them preventing flow away from the cylinders with which they are associated, thereby allowing the restrictions to control the rate at which air leaves the cylinders. The air leaving the cylinders escapes from the valves to atmosphere as indicated by the dotted lines in FIGURE 6.

Figure 2:
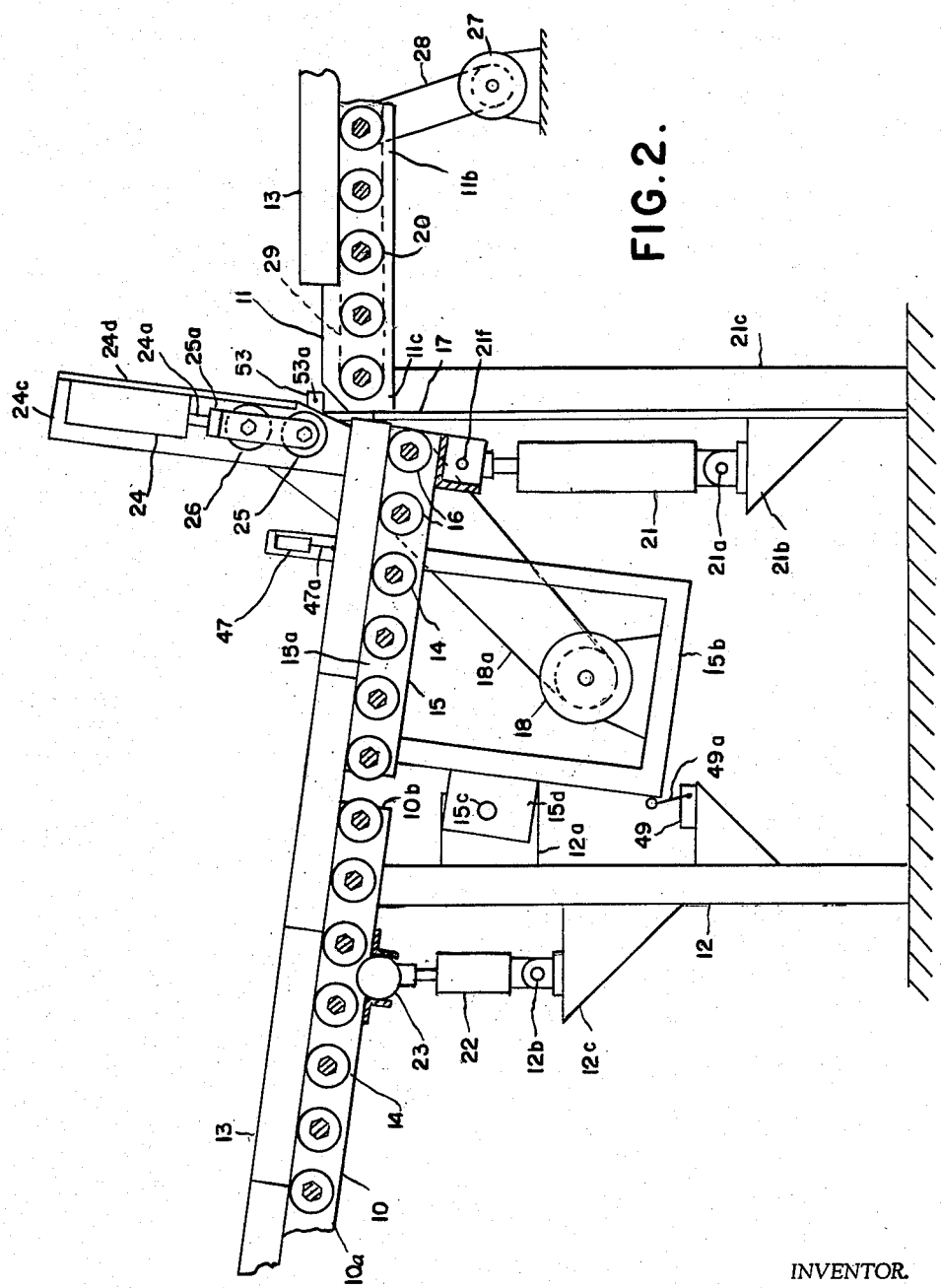
FIGURE 2 is a view similar to FIGURE 1, but showing the apparatus in storing position.

The conveyer 10 may be loaded from the left by any suitable equipment, not shown. The articles 13 will roll down the conveyer 10 from left to right, end-to-end, because the rollers 14 are free to rotate. During this time, the tilting conveyer will be tilted at substantially the same angle as the conveyer 10, as shown in FIGURE 2, to form in effect a continuation of conveyer 10. The articles will roll over the freely turning rollers 14 on the tilting conveyer. The two driven rollers 16 should be under power when the articles engage them so that the leading article will advance toward and engage the fixed stop 17. The automatic control apparatus to be described hereinafter provides for this. Should the driven rollers 16 not be turning, they might have sufficient drag to prevent the articles from reaching the stop 17. It is important that the articles engage the stop 17 so that there will be two power driven rollers 16 under the article to drive it from the tilting conveyer 15 when that conveyer is aligned with the power driven conveyer 11.

So that rollers 16 will not be continuously turning while an article 13 is resting against stop 17, limit switch 47 is provided on the tilting conveyer to de-energize motor 18 when its operating member 47a is contacted by an article 13. There is no brake on motor 18 so that it can coast sufficiently after it is de-energized to enable the article engaging the operating member 47a of limit switch 47 to move up to stop 17.

Articles 13 will continue to flow on to conveyers 10 and 15 up to the storage capacity of the conveyers. The articles may be removed one by one from conveyer 15 whenever the equipment to the right of conveyer 11 gives the signal.

When a signal is received for an article 13, the following sequence of events occurs. The conveyer 15 is caused to align itself with conveyer 11 by air cylinder 21. Thus as seen in FIGURE 1, the tilting conveyer will swing up to horizontal position. Simultaneously, air cylinder 22 operates to wedge the brake 23 between two rollers of the inclined conveyer 10 to keep them from rotating. Brake 23 causes articles 13 to drag on the two rollers 14 and this in turn holds all articles to the left from exerting force on those articles to the right.

When cylinders 21 and 22 operate, the rollers 20 on conveyer 11 are rotated by motor 27. If desired, rollers 20 could already be rotating. When conveyer 15 is aligned with conveyer 11, limit switch 49 will be released causing air cylinder 24 and motor 18 to operate. Air cylinder 24 causes the pinch roller 25 to increase the rolling friction between article 13 and driving rollers 16. In some instances, the pinch roller 25 may not be required, since very often there is enough rolling friction without it. Therefore, a selector switch can be included in the electrical circuit to render the cylinder 24 inoperative when desired.

As soon as rollers 16 begin to rotate, the article 13 engaging those rollers is transferred from conveyer 15 over stop 17 to conveyer 11. The article immediately behind the one separated and transferred to conveyer 11 should not advance due to the fact that the tilting conveyer 15 is horizontal at this time and also because the brake 23 prevents the remaining stored articles from exerting any driving force. However, this article may creep slightly, as discussed more fully hereinafter.

As the article 13 passes over the stop 17 and onto conveyer 11, its leading end strikes the operating member 53a of a limit switch 53. This causes electrical circuit preparations. When the trailing end of article 13 passes beyond limit switch 53, the limit switch is released to signal cylinders 21, 22 and 24 to retract and to prepare for the de-energization of motor 18. When air cylinders 21, 22 and 24 retract, the articles 13 to the left of brake 23 are free to roll forward. Motor 18 will be de-energized when the next article from the left makes contact with limit switch 47. The motor 18 will coast sufficiently to allow rollers 16 to turn and carry the next article forward against stop 17.

The limit switch 53 is located very close to tilting conveyer 15 so that the tilting conveyer will be signalled to descend to the FIGURE 2 position as soon as possible. This close timing is desirable to keep the next article from entering conveyer 11 in the event it should be creeping down from conveyer 10.

Figure 5:
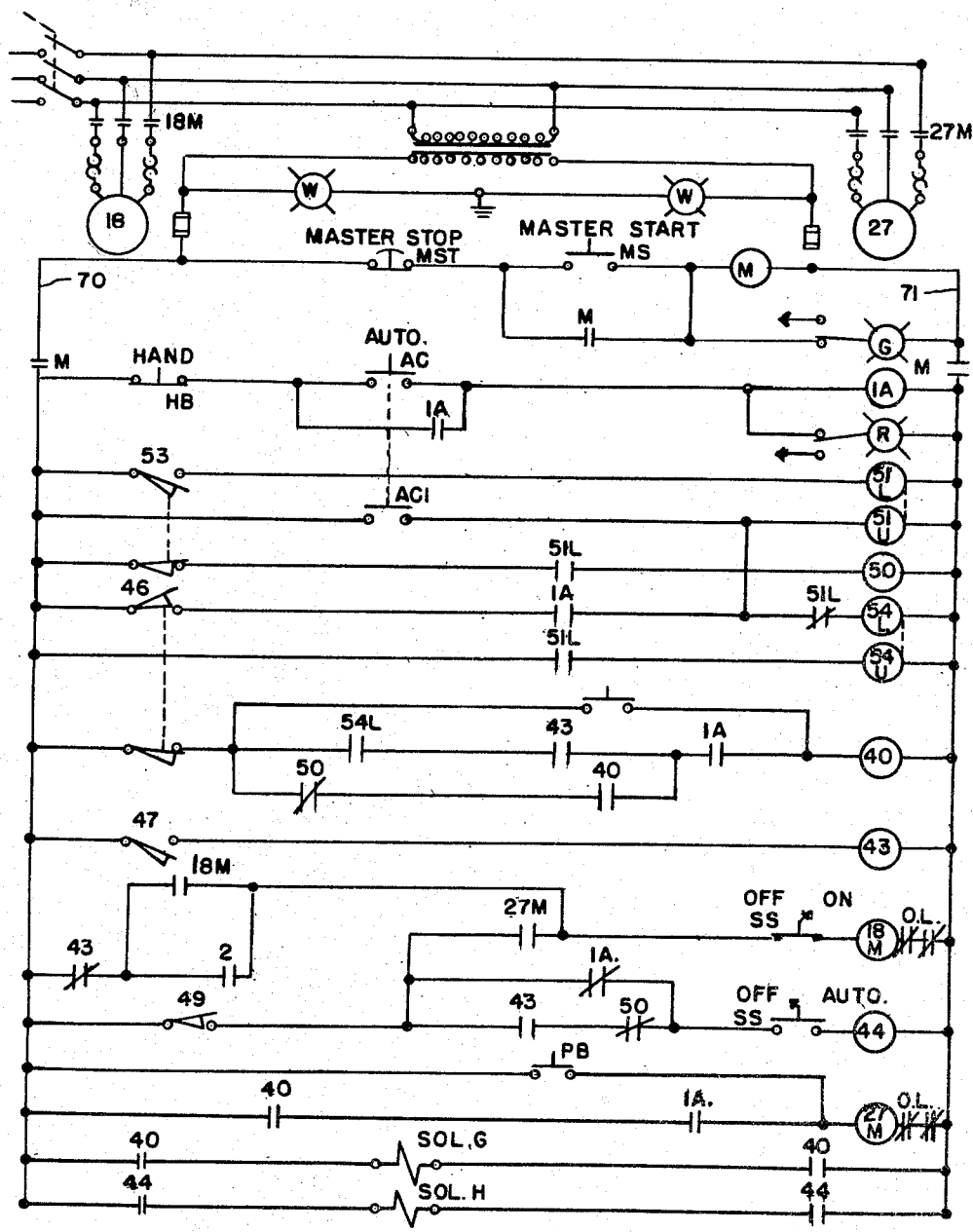
FIGURE 5 is a schematic wiring diagram showing the control devices and wiring necessary for automatic operation.

The operation of the device will now be described in greater detail with reference to the electrical pneumatic diagrams shown in FIGURES 5 and 6. Let it be assumed that the apparatus is in the FIGURE 2 position even though FIGURE 5 shows no article 13 under limit switch 47. When the operator depresses the master start button MS, the relay M energizes and remains energized after release of the master start button through the sealing circuit around the master start button which contains a contact of the relay. The relay M also has contacts in the lines 70 and 71 which close to energize the rest of the circuit. The green lamp G now glows.

Since the operating member 47a of limit switch 47 is engaged by an article 13 on conveyor 10, this limit switch is closed and a circuit is established to relay 43. This relay is energized and closes its contacts in the circuits of relays 40 and 44. Energization of relay 43 opens its contacts to relay 18M so that the power driven rollers 16 under the article 13 on the tilting conveyor will not be turning while that article is up against stop 17.

When the operator depresses the automatic cycle push button AC, the following events occur: Relays 1A and 51U become energized and the red pilot lamp glows. Relay 1A has contacts which close in a sealing circuit around the automatic cycle push button AC to seal in the circuit to relay 1A after the automatic cycle push button is released. Relay 1A also has contacts which close in the circuits to latching relay 54L, relays 40 and 27M, preparing the circuits to those relays, and opens its contacts to relay 44.

Relay 51U is momentarily closed by the second contact AC1 of the automatic cycle push button to unlatch relay 51L if it should be latched up. Relay 51L in turn opens a circuit to relay 50, opens a circuit to relay 54U, and closes a circuit to relay 54L, by the operation of its contacts in those circuits. Relay 54U will have unlatched relay 54L if it should be latched up. Relay 50 de-energizes and closes its contacts to relay 40. Relay 54L may now latch up since relay 54U is de-energized.

Normally, relay 51L would have been unlatched and relay 54L latched. However, if the operator would happen to depress the master stop button MST or a hand button HB at an odd moment when the circuit was sequencing through its cycle, relay 51L could become latched and relay 54L unlatched. Hence the need for the contacts AC1 of the automatic cycle push button in the circuits to relays 51U and 54L.

When relay 54L latches, a circuit is established to relay 40. The limit switch 46 is in the position shown in FIGURE 5 when the conveyor 11 to the right is ready for another article 13, to signal the transfer of the next article. In this position of limit switch 46, it opens the circuit to relay 54L and closes the circuit to relay 40. However, in the event that there is an article 13 on conveyor 11 that has not been discharged, limit switch 46 would be in its other position opening the circuit to relay 40 and closing the circuit to relay 54L. In such a case, relay 40 would not become energized and the device would not separate or transfer the next article to conveyor 11. If such is the case, the motor 27 for the rollers 20 of conevyor 11 can be operated by manually pressing push button PB in the circuit to relay 27M to discharge the article on conveyor 11 past the limit switch 46 to release it and allow it to assume the position shown in FIGURE 5. Limit switch 46 is not shown in FIGURES 1 and 2 because it is operated by a permissive mechanical arrangement beyond conveyor 11. Normally, however, the article 13 previously transferred to conveyor 11 will be discharged in the normal course of events, and when discharged will cause limit switch 46 to automatically reset to the FIGURE 5 position to signal the separating apparatus to transfer another article 13 to conveyor 11.

When relay 40 is energized, a sealing circuit to the relay is closed through one of its own contacts, and other contacts of the relay close to energize the circuits to relay 27M and solenoid G.

Solenoid G, when energized, shifts valve 21h to cause air cylinder 21 to raise tilting conveyor 15 into horizontal alignment with conveyor 11. This operation of valve 21h also operates air cylinder 22 to apply the brake 23 to two of the rollers 14 of conveyor 10 to hold back the articles 13.

When conveyor 15 is horizontal, it releases the operating member 49a of limit switch 49 which will close a circuit to relays 18M and 44 provided their selector switches SS are in the ON and AUTO positions respectively. Relay 18M prepares its sealing circuit by the closing of its contact therein, and has other contacts which close the circuit to motor 18. Relay 44 closes the circuit to solenoid H through its contacts in the latter circuit. Hence limit switch 49 starts motor 18 and operates solenoid H when the tilting conveyor swings to a horizontal position.

Motor 18 powers rollers 16 to drive the article 13 onto conveyor 11, over the upper edge of stop 17. The rollers 20 of conveyor 11 are already rotating, having been started by the motor 27 in response to energization of relay 27M. These rollers turn at the same peripheral speed to reduce sliding friction, and hence prolong their useful life.

Solenoid H, which was energized simultaneously with motor 18, shifts valve 24e to cause air cylinder 24 to press the pinch roller 25 down on the article being advanced by power rollers 16.

Article 13, as it advances, will strike the operating member 53a of limit switch 53, which will close the limit switch to complete the circuits to relay 51L and open its contacts in the circuit to relay 50. Relay 51L will latch up, closing its contacts to relay 50, opening its contacts to relay 54L, and closing its contacts to relay 54U to unlatch relay 54L. Relay 54L opens its contacts in a circuit to relay 40. However, relay 40 does not drop out at this time because a circuit is still maintained through the closed contacts of the de-energized relay 50.

Before the operating member 53a of limit switch 53 slides off the trailing end of the article being transferred, the operating member 47a of limit switch 47 slides off the end of the article to open a circuit to relay 43. Relay 43 de-energizes, opens its contacts to relay 40, closes a sealing circuit ot relay 18M, and opens the circuit to relay 44. Relay 44 de-energizes and through its contacts opens the circuit to solenoid H. Hence solenoid H causes cylinder 24 to retract the pinch roller 25 when the trailing end of article 13 moves beyond and releases the operating member 47a of limit switch 47.

Relay 50 has a normally closed contact in the circuit of relay 44 for the following reasons. Limit switch 47 should be as close to pinch roll 25 as practical. However, if the articles are quite short, it is possible that limit switch 47 will stay engaged after an article has been transferred to conveyor 11, because of the practical limitations of locating limit switch 47 too close to roll 25. Without the normally closed contact 50, the pinch roll 25 would stay down until the tilting conveyer 15 opened limit switch 49. If the pinch roll stays down too long, it might interfere with the next article rolling up to stop 17a. Therefore with the normally closed contact of relay 50, relay 44 may be de-energized, as is relay 40, as soon as the trailing end of the article passes limit switch 53. By the time this normally closed contact of relay 50 closes again, limit switch 49 will be open before the article engages limit switch 46 to energize relay 51U. When 51L unlatches it opens up relay 50.

When the article 13 has traveled far enough so that its trailing end moves beyond and releases the operating member 53a of limit switch 53, the switch 53 assumes the position illustrated in FIGURE 5 to open the circuit to relay 51L and close the circuit to relay 50. Relay 50 opens the circuit, through its contacts, to relay 40. It may also operate a signal of some kind to the right of conveyer 11 to indicate that an article 13 has been transferred and is ready for further processing.

Relay 40 being now de-energized by the movement of the separated article beyond limit switch 53, opens its contacts in its sealing circuit, opens the circuit to relay 27M, and likewise opens the circuit to solenoid G.

Relay 27M de-energizes to open the circuit to and de-energize motor 27 to stop rollers 20. Relay 27M also opens its contacts in a circuit to relay 18M, but the latter relay remains energized through the contacts of relay 43.

The de-energization of solenoid G reverses air cylinder 21 to lower the tilting conveyor 15 to the FIGURE 1 position in which it is angled at the same slope as conveyor 10. The air cylinder 22 is also reversed to release the brake 23 from the two rollers 14. When conveyer 15 is in the inclined FIGURE 1 position, limit switch 49 opens.

When the next article moving down strikes the operating member 47a of limit switch 47, it closes the circuit to relay 43, and the contacts of the latter relay open in the circuit to relay 18M to de-energize it. Relay 43 also has contacts in the circuit to relays 40 and 44 which open.

The de-energization of relay 18M, when the next article contact operating member 47a of limit switch 47, causes the relay to open its sealing contacts and its contacts in the circuit to motor 18, taking power off rollers 16. The motor 18, however, has enough momentum to coast sufficiently to allow the next article to advance up to and engage stop 17.

When the transferred article on conveyer 11 is discharged, limit switch 46 will be reset to the position illustrated in FIGURE 5 opening its circuit to relay 54L and closing the circuits to relay 40, for a repeat of the cycle.

If it should happen that conveyers 10 and 15 become empty, and the power is turned off to relay 18M, the relay would lose its sealing circuit by the opening of its contact therein. Therefore, contacts 2 are provided in the circuit of relay 18M. These contacts will close when articles again start to move down conveyer 10 to reestablish the circuit to relay 18M to maintain the power on rollers 16 as previously explained.

What I claim as my invention is:

1. A conveyer storing and separating device comprising an elongated gravity-type conveyer sloping downward towards its discharge end and having free turning transverse rollers spaced apart along the length thereof, a tilting conveyer having a receiving end adjacent the discharge end of said gravity-type conveyer to receive articles therefrom and pivoted for movement about a horizontal axis near its receiving end, said tilting conveyer having transverse idler rollers near its receiving end and at least one power driven roller near its discharge end, power means for operating said power driven roller, power means for pivoting said tilting conveyer between a horizontal position and an inclined position in which it extends downward toward its own discharge end at substantially the same slope as said gravity-type conveyer, a third conveyer having its receiving end adjacent the discharge end of said tilting conveyer when the latter is horizontal to receive articles therefrom, a limit switch operable to energize the first-mentioned power means to operate said power driven roller in response to the movement of said tilting conveyer to horizontal position and a stop positioned to block the transfer of articles from said tilting conveyer to said third conveyer in the inclined position of said tilting conveyer but to clear such articles for transfer in the horizontal position of said tilting conveyer.

2. The conveyer storing and separating device defined in claim 1, including a limit switch operated by an article completely transferred from said tilting conveyer to said third conveyer for operating the second-mentioned power means to return said tilting conveyer to its inclined position.

3. The conveyer storing and separating device defined in claim 2, wherein a brake is provided for at least one of the rollers on said inclined conveyer to stop the flow of articles thereon when said tilting conveyer is in horizontal position, said last mentioned limit switch being effective to release said brake simultaneously with the movement of said tilting conveyer back to inclined position.

4. A conveyer storing and separating device comprising an inclined conveyer sloping downward toward its discharge end, a tilting conveyer at the discharge end of said inclined conveyer to receive articles therefrom, said tilting conveyer in one position extending from the discharge end of said inclined conveyer at a downward slope, a stop adapted to engage and block articles on said tilting conveyer in the said one position thereof, means for pivoting said tilting conveyer to clear said stop, said tilting conveyer having longitudinally spaced article supporting rollers, and power means for driving at least one of said rollers.

5. A conveyer storing and separating device comprising an inclined conveyer sloping downward towards its discharge end, a tilting conveyer at the discharge end of said inclined conveyer to receive articles therefrom, said tilting conveyer in one position extending from the discharge end of said inclined conveyer at a downward slope, a stop adapted to engage and block articles on said tilting conveyer in the said one position thereof, means for pivoting said tilting conveyer to clear said stop, and means for pivoting said tilting conveyer to the said one position thereof in response to the movement of an article completely beyond said stop.

6. A conveyer storing and separating device comprising an inclined conveyer sloping downward toward its discharge end, a tilting conveyer at the discharge end of said inclined conveyer to receive articles therefrom, said tilting conveyer in one position extending from the discharge end of said inclined conveyer at a downward slope, a stop adapted to engage and block articles on said tilting conveyer in the said one position thereof, means for pivoting said tilting conveyer to clear said stop, and means for preventing the movement of articles along said inclined conveyer when said tilting conveyer is pivoted to clear said stop.

7. A conveyer storing and separating device comprising an inclined gravity type roller conveyer sloping downward toward its discharge end, a tilting conveyer at the discharge end of a said inclined conveyer to receive articles therefrom, means pivotally mounting said tilting conveyer for movement about a horizontal axis adjacent said discharge end of said inclined conveyer, said tilting conveyer in one position of pivotal movement extending from the discharge end of said inclined conveyer toward its own discharge end at substantially the same downward slope as said inclined conveyer, a stop adjacent said discharge end of said tilting conveyer adapted to engage and block articles on said tilting conveyer in the said one position thereof, means for pivoting said tilting conveyer to substantially a horizontal position clearing said stop, said tilting conveyer having longitudinally spaced article supporting rollers, and power means for driving at least one of said rollers adjacent the discharge end of said tilting conveyer, the remainder of said rollers being mounted to turn freely.

8. The conveyer storing and separating device defined in claim 7, wherein means are provided for actuating said power means in response to the pivoting of said tilting conveyer to substantially horizontal position.

9. The conveyer storing and separating device defined in claim 8, wherein means are provided for automatically pivoting said tilting conveyer to the said one position thereof in which it slopes downwardly in response to the movement of an article by said power-driven roll completely beyond said stop.

10. The conveyer storing and separating device defined in claim 9 wherein means are provided for stopping said power means in response to the pivoting of said tilting conveyer to the said one position thereof and the movement of another article onto said tilting conveyer.

11. The conveyer storing and separating device defined in claim 7, wherein a pressure roller is mounted on said tilting conveyer above said power driven roller, and means are provided to advance said pressure roller toward said power driven roller when the latter is rotated to press an article into greater friction contact with said power driven roller.

12. The conveyer storing and separating device defined in claim 7 wherein said inclined conveyer has a plurality of longitudinally spaced article supporting rollers supported for free rotation and brake means are provided to prevent movement of articles along said inclined conveyer when said tilting conveyer is pivoted to substantial horizontal position, said brake means including a braking element engageable with one of the rollers of said inclined conveyer near the discharge end thereof to prevent the free rotation thereof.

13. A conveyer storing and separating device comprising an elongated gravity type conveyer sloping downward toward its discharge end and having free turning transverse rollers spaced apart along the length thereof, a tilting conveyer having a receiving end adjacent the discharge end of said gravity type conveyer to receive articles therefrom and pivoted for movement about a horizontal axis near its receiving end, power means for pivoting said tilting conveyer between an inclined position in which it extends downward toward its own discharge end at substantially the same slope as said gravity type conveyer and a horizontal position, a third conveyer having its receiving end adjacent the discharge end of said tilting conveyer when the latter is horizontal to receive articles therefrom, a stop positioned to block the transfer of articles from said tilting conveyer to said third conveyer in the inclined position of said tilting conveyer but to clear such articles for transfer in the horizontal position of said tilting conveyer, a brake for at least one of the rollers on said inclined conveyer to stop the flow of articles thereon, and power means for operating said brake.

14. The conveyer storing and separating device defined in claim 13, wherein means are provided for operating said first and second mentioned power means to simultaneously set said brake and move said tilting conveyer to horizontal position, and means responsive to the discharge of an article from said tilting conveyer to said third conveyer for operating said first and second mentioned power means to release said brake and move said tilting conveyer to its inclined position.

15. A conveyer storing and separating device comprising an elongated gravity type conveyer sloping downward toward its discharge end and having free turning transverse rollers spaced apart along the length thereof, a tilting conveyer having a receiving end adjacent the discharge end of said gravity type conveyer to receive articles therefrom and pivoted for movement about a horizontal axis near its receiving end, power means for pivoting said tilting conveyer between an inclined position in which it extends downward toward its own discharge end at substantially the same slope as said gravity type conveyer and a horizontal position, a third conveyer having its receiving end adjacent the discharge end of said tilting conveyer when the latter is horizontal to receive articles therefrom, a stop positioned to block the transfer of articles from said tilting conveyer to said third conveyer in the inclined position of said tilting conveyer but to clear such articles for transfer in the horizontal position of said tilting conveyer, said tilting conveyer having idler rollers near its receiving end and at least one power driven roller near its discharge end, and power means for operating said power driven roller in response to movement of said tilting conveyer to horizontal position.

16. The conveyer storing and separating device defined in claim 15, wherein means are provided for stopping said last-mentioned power means in response to the pivoting of said tilting conveyer to said inclined position thereof and the movement of another article onto said tilting conveyer.

References Cited by the Examiner
UNITED STATES PATENTS

| | | | |
|---|---|---|---|
| 1,425,599 | 8/22 | Lister | 193—35 |
| 2,118,195 | 5/38 | Hogue | 193—35 |
| 2,413,979 | 1/47 | Lamb | 198—127 |
| 3,058,564 | 10/62 | Kubat. | |

SAMUEL F. COLEMAN, *Primary Examiner.*

WILLIAM B. LA BORDE, *Examiner.*